United States Patent [19]
Dofek

[11] 3,791,244
[45] Feb. 12, 1974

[54] SHEARING MACHINE FOR CUTTING OF BAND MATERIAL

[75] Inventor: Frantisek Dofek, Zdar Nad Sazavou, Czechoslovakia

[73] Assignee: Zdarske Strojirny a slevarny, narodni podnik, Zdar nad Sazavau, Czechoslovakia

[22] Filed: July 14, 1972

[21] Appl. No.: 271,709

[30] Foreign Application Priority Data
July 16, 1971 Czechoslovakia ............... 71/5249

[52] U.S. Cl. ..................... 83/305, 83/311, 83/324
[51] Int. Cl. ............................................. B23d 25/12
[58] Field of Search ............. 83/324, 311, 305, 298

[56] References Cited
UNITED STATES PATENTS
2,262,971   11/1971   Sieg .................................. 83/324 X
3,308,701   3/1967   Frohling ............................... 83/324
3,613,471   10/1971   Shields .............................. 83/324 X Primary Examiner—J. M. Meister
Attorney, Agent, or Firm—Murray Schaffer

[57] ABSTRACT

A shearing machine for cutting metal bands is provided in which the cutters are synchronized with the rate of feed, within a predetermined range of cut lengths, by imparting to the cutters a variable speed in the feed direction. A twin crank synchronizing mechanism is employed for this purpose and variations of the speed are controlled by adjustment of the eccentricity between the cranks of the twin crank mechanism.

11 Claims, 4 Drawing Figures

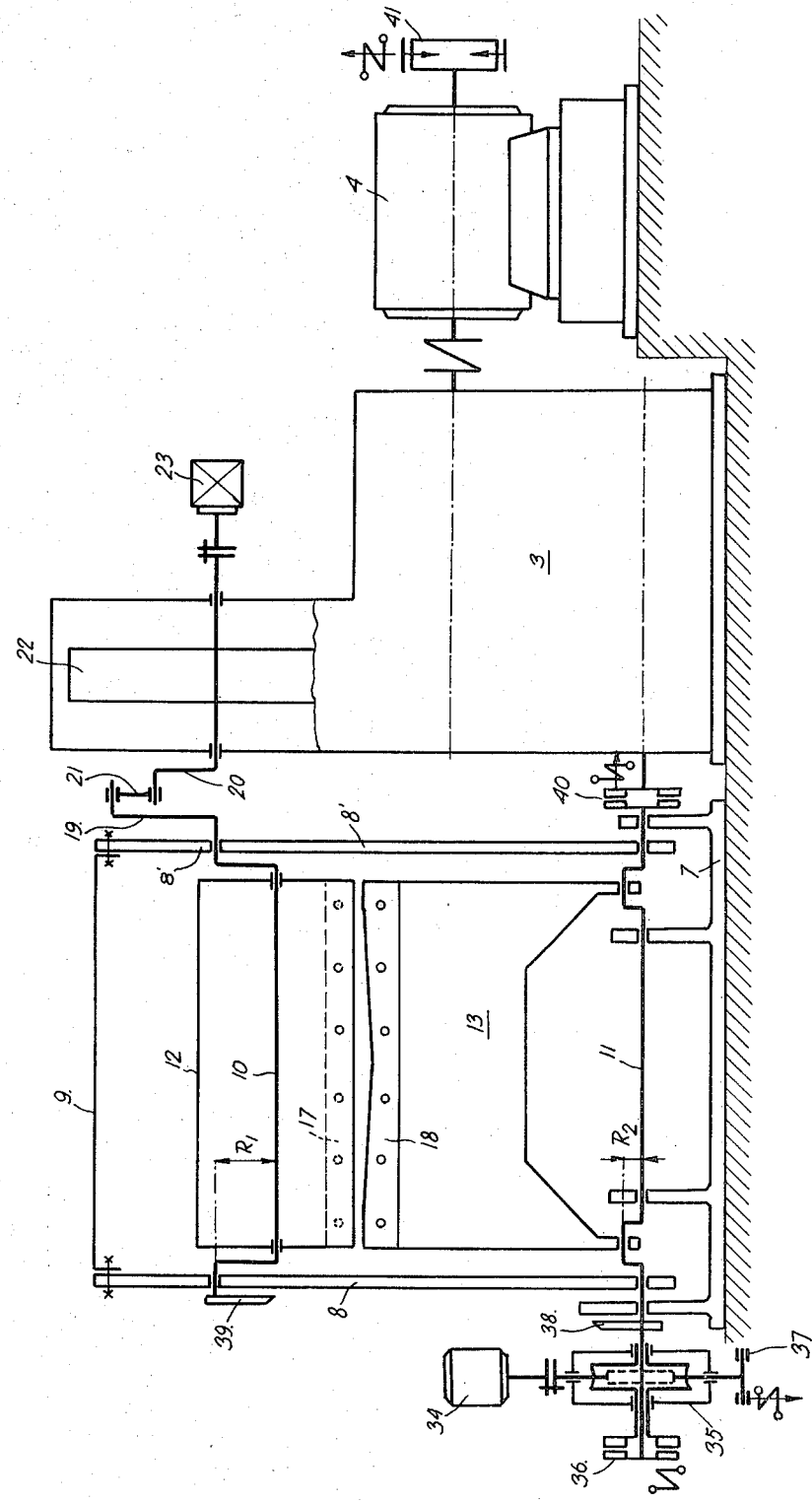

SHEARING MACHINE FOR CUTTING OF BAND MATERIAL

BACKGROUND OF INVENTION

The present invention relates to a shearing machine for cutting band material, particularly for the cutting of metal bands.

The invention provides a simple means for syncronizing the operation of the cutting knives during their operation with the feed speed of the band material and permits adjustment while the machine is either at rest or in operation. The invention is applicable to shearing machine employing either a four-joint or parallel cutting mechanism or drum type cutter mechanism. The arrangement of the drive of the shearing machine, furthermore, allows the ready conversion of the shearing machine from cutting during the constant feeding of the material to operation where the cutting is performed with the material at rest or vice versa.

The known shearing machines of this kind, frequently referred to as flying shears, are generally of two types. One type, for example, the Hallden System, employs an oscillating frame to which the upper cutting knife is fixed and a slidably guided support to which the lower cutting knife is fixed. A synchronized movement, depending upon the desired length of cut, is obtained by changing the amplitude of the oscillating movement of the frame. A second group of shearing machines uses a four-joint cutting mechanism and provides for synchronized movement according to length of the cut, by increasing or decreasing the radius of cutting crank which supports the upper cutting knife. Thus, the design of the shearing machine is necessarily substantially more complicated since it is necessary to raise or lower the entire upper portion of the shearing machine, as changes in the cutting crank radius are made in order to maintain a constant overlapping of the cutting knives.

In general, shearing machines do not enable the cutting of the band material, while it is at rest, and most of such designs allow the adjustment of the synchronized movement at rest only. The known machines are also rather complicated and require equally complicated synchronizing mechanisms and rather large installation areas. In many instances these machines do not permit adjustment of the synchronized movement during the course of the operation.

It is one object of this invention to provide a shearing machine of the cutting band material during the course of the constant feeding of such material, the machine permitting easy adjustment of the machine for the cutting of material having lengths within a predetermined range.

It is another object of this invention to provide a shearing machine in which the range of cut lengths may be increased by introducing a simple mechanism for missing or omitting one or more cutting strokes of the machine.

It is still another object of this invention to provide a shearing machine of the character specified in which stationary cutting to any desired length may be achieved.

It is still another object of this invention to provide a shearing machine permitting simple and rapid adjustment of the length of material cut and a quick conversion from cutting in the course of constant feeding of the cut material to stationary cutting and vice versa.

Further objects and advantages will be apparent from the following disclosure.

SUMMARY OF INVENTION

According to the present invention there is provided a shearing machine for cutting band material, comprising a main frame on which are carried upper and lower cutter elements and having means for feeding the band material to the cutter elements. The machine includes means for driving the cutter elements and material feed means, at least one of said cutter elements being rotatably mounted in the sidewalls of the cutter frame. A twin crank synchronizing mechanism is operatively connected between said cutter element drive means and the cutter element mounted in said cutter frame and comprises a driving crank secured to said cutter element drive means, a driven crank adapted to drive said cutter element operatively connected thereto, and a connecting rod linking said driving and driven cranks. The driving crank is rotatable about an axis which is in fixed spatial relationship to the main frame, and the driven crank is rotatable about an axis pivotable with the cutter frame.

The shearing machine may employ either a four-joint cutting mechanism with cutting knives or a drum cutting mechanism with two cutter drums. The shearing machine is preferably provided with a shaft coaxial with the pivotal axis of the cutter frame having offset crank portions which determine the position of the lower cutting element with resepct to the upper cutting element. In the event that cuts are to be missed, means are provided for imparting to the shaft a rotational speed which is a proper fraction of the rotational speed of the twin crank mechanism. Means are also provided for stabilizing the position of the upper cutting element and for imparting to the shaft a rotational motion causing the lower cutting element to perform the cutting stroke when stationary cutting is desired.

In order that the invention may be more fully understood, it will now be described by way of example, in greater detail, with reference to the accompanying drawings.

BRIEF DESCRIPTION OF DRAWINGS

In the drawings:

FIG. 4 shows a shearing machine together with its drive in a vertical elevational view taken along the axis of the main cutter crank in a plane as indicated by B—B in FIG. 1.

DESCRIPTION OF INVENTION

Figure 1:
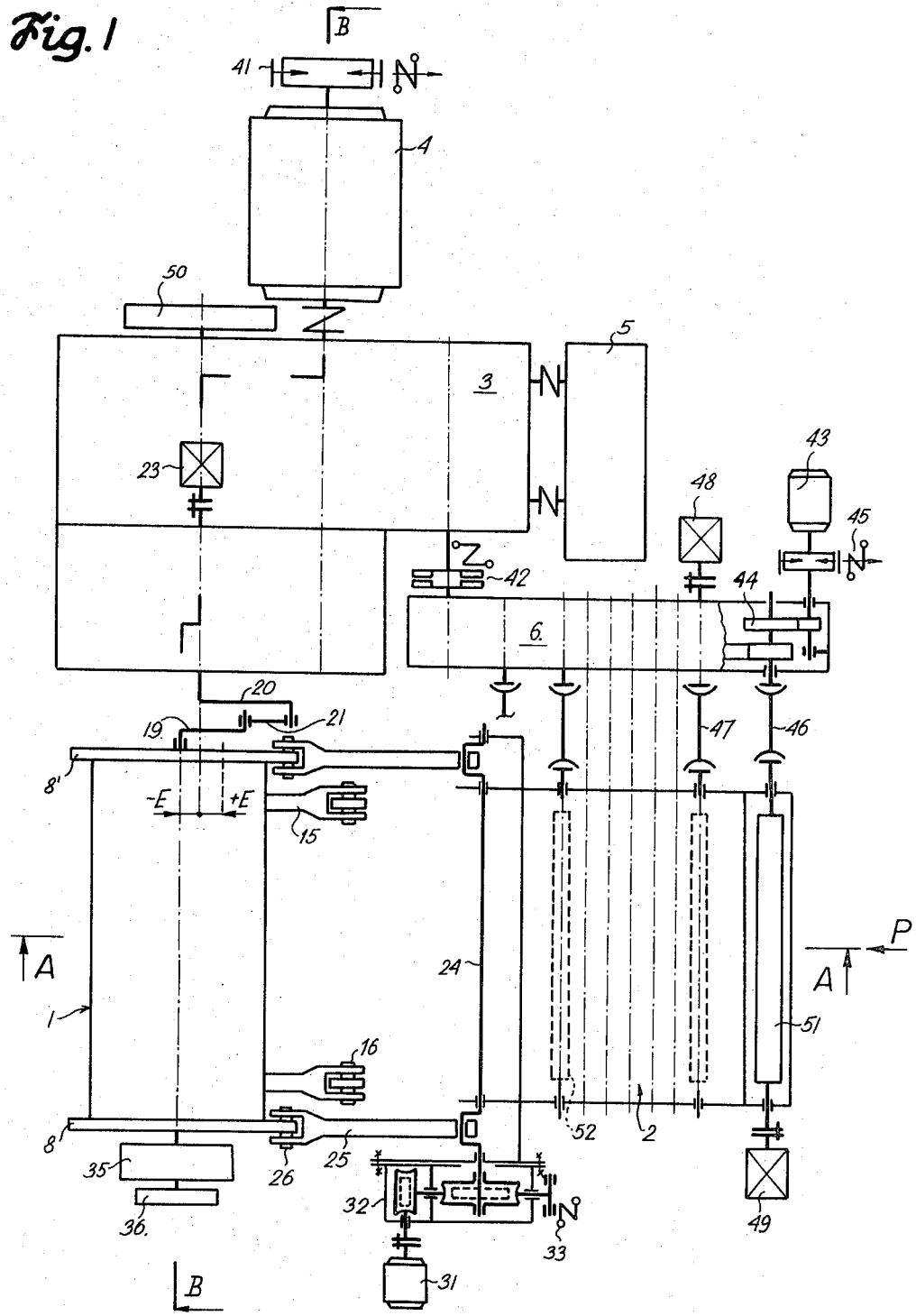
FIG. 1 is a plan view, partially in the form of a block diagram, of a shearing machine having feeding and straightening devices and driving means in addition to the improved cutting system.
Figure 2:
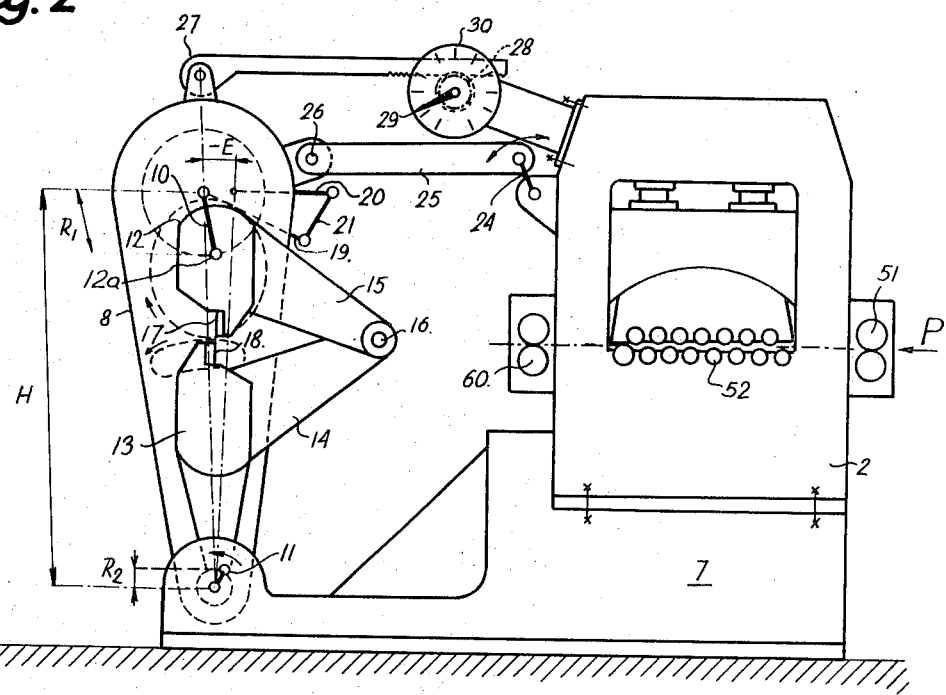
FIG. 2 is a side elevation of the shearing machine of FIG. 1 partly by sectional view taken along a plane as indicated in FIG. 1 by A—A.

Referring to FIG. 1 there is shown cutters 1 together with the feeding and straightening device 2 driven by a main electric motor 4. The raw stock bank material is fed from right to left as seen in FIG. 1 and FIG. 2. The cutters comprising a main cutting crank 10 and the feeding and straightening device including rollers 51 and 52 respectively are driven by coupling them to a main transmission gear case 3 which branches and divides the driving power from the main driving motor 4 to each of the cutters 1 and to the feeding and straightening device 2. The length of the material cut depends upon the overall transmission ratio between the revolutions of the feed and straightening rollers 51, 52 and the revolutions of the main cutter crank 10. In order to enable the continuous adjustment of the length of material to be cut, within a given range, a variable speed gear box 5 is connected in known manner with a differential gear provided in the main transmission gear case 3. The output shaft of the differential gear is connected by means of a clutch 42 to a transmission case 6 containing transmission gears connected by shafts 46 and 47 to the straightening rollers 52 and the feed rollers 51.

The cutting mechanism of the shearing machine shown in the embodiment in FIG. 2 comprising a four-joint mechanism arranged within a frame housing. The main cutter crank 10 is journalled in suitable bearings in sidewalls 8,8' of the cutter frame. A support 12 carrying the upper cutting knife 17 is rotatably journalled about an axle pin 12a located on the main cutter crank 10 at a radius R1 from its center. The support 12 is held by a pair of arms 15 each pivotably connected by eccentric bolts 16 with a second pair of arms 14 which hold a lower support 13 on which lower cutting knife 18 is secured. By turning the eccentric pins 16 the clearance between the cutting knives 17,18 is adjusted. The eccentric bolts may have offset centers or eccentric perimeters. The support 13 of the lower cutting knife is arranged rotatably on an offset crank arm extending from a shaft 11 which shaft is adapted to enable the knives to miss one or more shearing strokes in the course of feeding the material, or, alternatively, to serve as the cutter shaft when stationary cutting is desired.

The interconnection of the swinging cutter 1 with the main transmission gear is shown schematically in detail in FIG. 4. The main cutter crank 10 is actuated by way of a twin crank mechanism comprising a driven crank 19, a driving crank 20 and an intermediate connecting rod 21 which serves both for adjustment of the synchronized movement of the cutter 1 with the feeding device and as a coupling between the main transmission gear 3 and the cutting 1. The driving crank 20 is fixed in spatial relationship to the main frame 7 by being fixed to the shaft of the toothed gear 22 comprising the last transmission stage of the main transmission gear 3. The bolt or stud of the driving crank 20 is linked by the connecting rod 21 to the driven crank 16 which, in turn, is fixedly connected with the main cutting crank 10. The driven crank 19 has the same radius as the driving crank 20, but, because of the intermediate connecting rod, they may be offset from axial alignment with each other by a distance E to either side of center (see FIG. 2). For convenience, the offset eccentrically from axial alignment toward the feed end of the machine is taken as +E while toward the outlet and it is taken as −E.

The side walls 8,8' of the cutter frame are mutually connected by a cross beam 9 and the cutter frame itself is pivotally supported at its lower part on a crank shaft 11. The shaft 11 itself is supported by four bearings located on the main frame 7 of the shearing machine. The frame 7 also supports the feeding straightening devices. The shaft 11 is driven by way of a claw clutch 40 from the main transmission case 3 which also contains the transmission gears necessary to reduce the rotational speed of shaft 11 to insure that the required number of cuts be missed.

It it is desired that the cutters cut a length of material which is within a so called fundamental length range, then shaft 11 is given the same rotational speed as that of main cutter crank 10 and a cut is performed for each revolution of crank 10 by simultaneously activating the lower and upper cutting elements. On the other hand, if the lengths are to be cut which are within a range which is a multiple (i.e. twice or four times) the fundamental range than shaft 11 is caused to rotate at a slower speed (i.e. half or one quarter) than the rotational speed of main cutter crank 10 so that the upper and lower cutters do not meet at every revolution of crank 10.

Rotation of the main cutter crank 10 causes the support 12 to rotate about a circular path defined by axle pin 12a as shown by the dotted lines in FIG. 2. By virtue of the fact that the support 13 for the lower cutting knife 18 is connected to the support 12 through the arms 14 and 15 and eccentric pins 16, the support 13 adopts a reciprocating swinging movement. When cutting the so called fundamental length, which is approximately equal to the circumference of the circle described by the main cutter crank 10, the corresponding transmission ratio (between straightening and feeding device 2 and cutters 1) is adjusted by the main transmission gear 3 and the variable speed gear box 5 so that the overall transmission ration i between the feeding roller 51 and the main cutter crank 10 is:

$$i = L_z / \pi \cdot D_o$$

where $L_z$ is the so called fundamental length, and $D_o$ is the diameter of the feed rollers 51.

When cutting the fundamental length $L_z$: the cutter crank 10 rotates uniformly at constant speed, and the driving crank 20 and driven crank 10 are maintained coaxial, that is, E = 0.

When, however, it is desired to cut a length of material shorter than the fundamental length $L_z$, it is necessary to adjust the machine so that between the feeding and straightening device 2 and the cutter 1 there is provided a smaller transmission ratio i. If this is not done and if the same feeding speed of the band is maintained and the cutting knives are given a higher speed, than the cut would thus not be performed synchronously with the feed speed and the knives would tear the material. The feeding and straightening device would consequently be stressed rather unfavorably, the knives would become quickly blunted, and the accuracy of the cut lengths would be impaired. Therefore, in order to avoid these disadvantages and to perform the cut always at a synchronous speed between the knives and the fed material, the twin crank synchronizing mechanism 19,20,21 is provided. By placing the driven crank 19 eccentric with respect to the driving crank 20 at a distance, for example −E, away from the feed end, that is, in the direction of the feeding of the cut material, as shown in FIG. 2. As a result, a new uniform angular speed is imparted to the main cutter shaft 10 within one revolution of the constant angular speed of the driving crank 20. If the driving crank 20 is in a horizontal position, while the cutting knives 17 and 18 are in their cutting position, the angular speed of the main cutter crank 10 is, at the moment of cutting, less in case of the eccentricity of the cranks is at a value −E than the speed of the driving crank 20 at the same moment. The magnitude of the eccentricity −E depends upon the desired magnitude of the cut length and upon the radii of the cranks of the twin crank mechanism. The shorter the length desired than the fundamental length $L_z$, the larger must be the distance −E.

Similarly, if the shearing machine has to cut a longer length that $L_z$, the angular speed of the driven crank 19, at the moment of the cutting has to be higher than the angular speed of the driving crank 20. In that case an eccentricity of the driven crank is adjusted in a direction opposite to the feeding of the material, to a value +E.

The adjustment of the synchronized movement, that is of the eccentricity ±E is performed by pivoting the whole cutter frame either in the same or opposite direction to that of the feeding of the material. Specifically, the cutter frame comprising wales 8,8' is rotated around shaft 11 for the angle α from the vertical plane. With an appropriate selection (all within the knowledge of those skilled in the art) of a suitable radius for the cranks 19 and 20, for the fundamental cutting length $L_z$, and of the corresponding maximum eccentricity +E and −E and of the distance H of the shaft 11 from the main cutter crank 10, the angular deviation α of the cutter frame is small and has substantially no influence on the quality of the cut.

Figure 3:
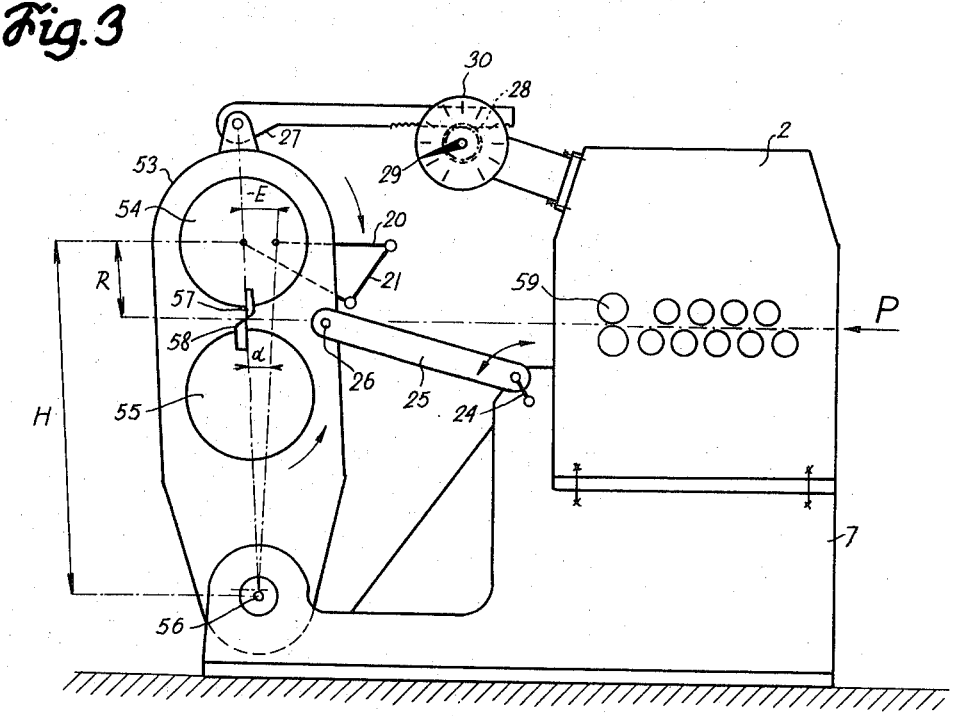
FIG. 3 is a view similar to FIG. 2 showing the invention incorporated in a drum-type shearing machine.

Pivotal movement of the cutter frame, that is the adjustment of the eccentricity of the twin crank mechanism, is accomplished by a crank shaft 24 journalled on the frame of the feeding and straightening device (FIG. 2) or on the main frame 7 of the machine (FIG. 3). The crank shaft 24 has two crank bearing connecting rods 25 connected pivotally by means such as bolts 26, with the side walls 8,8' of the cutter frame. The drive of the crank shaft 24 is accomplished by an electric motor 31 connected to a selectively disconnectable transmission 32 by which there is secured a high transmission ratio by a twin worm transmission. The crank shaft 24 is fixed in its selected adjusted position by a brake 33. The adjusting means are driven synchronously with the cutters and is provided with means arranged so as to allow for adjustment of synchronism even in the course of operation of the shearing machine at full speed.

The required pivotal movement of the cutter frame to obtain the desired cut length can be read on a circular scale 30 where it may be directly indicated in milimeters. Scale 30 comprises a pointer 29 which is firmly connected to a pinion 28 which meshes with a rack 27. The rack is pivotally connected with the cutter frame. The scale 30 is firmly connected with the frame of the feeding and straightening device 2 or the machine frame 7.

If the cutter crank 10 does not rotate uniformly, an angular acceleration and deceleration of the driven crank 19 is generated which periodically changes during each revolution. Dynamic torques forces are thereby created, the magnitude of which depends on the eccentricity E, on the rotational speed of the driving crank 20 and on the moment of the inertia of the mass of the cutters which receive a variable speed from the driven crank 19. In order to limit these moments to reasonable values, the maximum rotational speed of the driving crank 20 is limited by a tachometer-governor 23 which is connected with the driving crank 20 and does not allow any speed increase of the shearing machine which would surpass, at any given length of cut, the allowable predefined angular acceleration. The actual feeding speed of the band in the course of cutting is indicated by a tachometer 48 on the gear transmission case 6. In order to prevent dynamic turning moments from unfavorably influencing the gear drive a fly-wheel 50 is connected to the pinion of the last transmission gear 22 of the main transmission gear case 3. This fly-wheel dampens the shocks due to the shearing and dynamic torque or moments of the shearing machine.

In the embodiment shown in FIG. 3 a somewhat simpler mechanism is shown which, however, does not allow for the omission of cuts. The cutting knives 57, 58 are fixed to cutter drums 54, 55. Both cutter drums 54, 55 are supported rotatably in the side walls of the cutter frame 53 which is pivotably supported on bolts 56 fastened to the fixed machine frame 7. The distance between the axes of rotation of the cutting drums 54 and 55 remain constant during operation If it is desired that strokes be omitted for this type of machine in order to obtain variable cut lengths, the lower cutting drum 55 is slidably supported in side walls of the cutter frame 53 so that the distance between the rotational axes of the cutter drums may be varied similarly as in the embodiment in FIG. 1. A through shaft with offset cranks may replace bolts 56, and the side walls of the cutter frame 53 may be supported on the main portion of the shaft. The offset cranks would determine, by way of a connecting rod, the position of the rotational axis of the lower cutter drum 55. However since, the movement of both the cutter knives 57, 58 of the cutter drums 54, 55 is along a circular path, this type of machine is not suitable for stationary cutting. As seen in this embodiment, both cutter drums 54, 55 are rotatable, the upper drum 54 by way of the twin crank mechanism previously described, and the lower drum 55 in dependence upon the drive of the upper drum 54, by use of direct gear connection. Otherwise the structure and operation of this embodiment is the same as that shown in FIGS. 1, 2 and 4.

The described arrangement of the twin crank synchronizing mechanism and its adjustment is substantially simpler than conventional systems and comprises solely rotatable couplings which can be designed with small tolerances and clearances. The synchronizing mechanism simultaneously fulfills the task of a coupling and permits operational adjustment so that the main transmission gear case can be situated close to the cutters, thus substantially reducing the required floor space. The described arrangement also possesses an advantage in that adjustment of the synchronized movement can be made in the course of operating the machine. Swithching of the various motors, clutches and related elements may be made wither manually or by remote control through the use of electromagnetic solenoid control elements as shown, or comparable pneumatic control elements. This is important particularly for the so called flying shears operating in manufacturing lines where a continuous process is needed, and as for instance, in those facilities where cut articles are provided with tin coatings.

In operation, the device is fed with a band of metal material supplied in a substantially endless coil or reel. The leading edge is fed along the line of arrow A between the first feed and straightening rollers 51 and 52 which is normally driven for continuous movement by the transmissions 3 and 6. The band passes through rollers 59 and 60 which hold it in a horizontal plane defined by the line extension of arrow P. The band passes into the mouth or space between knives 17 and 18 which is generally arranged along this plane.

The particular arrangement of the drive for the machines as shown in the Figures permits the rapid changing of the operation of the machine from the automatic cutting of a continuously moving band to a machine in which the band of material is sectionally fed and individual pieces are cut while the band is at rest. The adjustment of the shearing machine for thus cutting stationary material is accomplished as follows:

The cutters are stopped in their cutting position, that is the main cutter crank 10 is stopped in its vertical lower position and is secured in this position by a brake 41 controlling the main drive 4. The cutters are adjusted to this position by the main driving motor 4 according to the pointer 39 or by an auxiliary drive which is stopped by a feeler or sensor arranged on the crank 10. The clutch 40 is simultaneously disengaged by remote control such as by the use of an electromagnetic device as schematically illustrated in FIG. 4. Simultaneously, a claw clutch coupling 36 is energized which connects a motor 34 to an auxiliary drive and to shaft 11 by way of the transmission gear case 35. A brake 37 is also part of this driving system. By rotating shaft 11 through the eccentric distance $R_2$ the offset crank portion are placed in their lowermost positions and locked there by brake 37, and the cutters are prepared for stationary cutting. This provides a space between the knives 17 and 18 for entry of the band material.

The continuous feeding of the band is arrested during cutting in a stationary position by remotely disengaging an electromagnetic coupling 42 which connects the transmission 3 with the transmission 6. The feeding of a prior chosen length of cut, is thereafter measured by an impulse feeler 49 which is driven by an auxiliary motor 43 secured on the transmission gear case 6 via gear 44 and a solenoid controlled brake 45. This auxiliary motor 43 is either permanently connected with the gears of the transmission gear case 6 or, in the event a wider range of cutting speeds is desired, is connected by gear means remotely controlled by means of an electromagnetic solenoid operated coupling. If the cutters 1 and the drives 2 are prepared for stationary cutting, that is, when crank 10 and the offset crank arms of the shaft 11 are in their lower positions, the couplings 40 and 42 disengaged and the coupling 36 closed, then the cutters may perform automatically an entire cutting cycle. The initiation of such cycle may be further controlled by a suitable push button. The motor 43 feeds the required length, measured by the impulse feeler 49 after which the feeding and straightening device 2 with the feeding rollers 51, is braked to a stop by the brake 45. Immediately thereafter the motor 34 causes shaft 11 to make one revolution in a direction opposite to that when rotated for cutting in the course of continuous feeding. Thus the upper cutting knife 17 is caused to remain stationary and the cutting stroke is performed solely by the lower cutting knife 18. This finishes one stationary cutting cycle. After the required number of cuts have been made, as for example cutting off of the imperfect starting end of the band, the cutters may again be adjusted for automatic cutting the continuously fed band. This change over is performed by reversing the sequence of movements above indicated. Indicating pointers 38 and 39 are secured to the exterior of the shafts 10 and 11 to show the relative angular positions of the shafts during any point of the operation. The coupling 40 connecting shaft 11 to the transmission 3 can be engaged when both pointers 38, 39 are in a position indicating the cutting position of the cutters.

The band material may be thereafter, continuously fed. In the course of operation the upper knife 17 is arranged to be spaced from the top surface of the band so as to just miss the edge of the upper cutting knife, so that in case cuts are to be omitted or stationary cuts are performed, the upper knife 17 would not come in contact with the band prematurely.

The present invention provides a cutting process that can be advantageously used in manufacturing facilities where metal sheets are cut from rolls of band material, and where it is necessary to cut off the first and parts of the band for removal to waste since these parts are generally of minor quality and their thickness tends to be greater than the normal thickness of the band. It is, furthermore, possible to use this method for taking samples of sheets at any location on the band or to remove faulty parts of the band.

A similar operating method is impossible with known shearing machines. The application of this shearing machine brings substantial savings. The cutting line is shortened since no special stationary cutters are needed and the feed rollers with the drive are situated in the feeding part of the cutting line behind the band uncoiling device. Known arrangements also do not enable sampling from intermediate parts of the band. When cutting the first part of the band on known shearing machines, the first cut piece has to be removed to waste. Normally the prior devices cut the band at any arbitrary length ranging from zero to the prior adjusted length. Using the shearing machine according to this invention such waste is eliminated as the last cut of the part which has been found inadequate is simultaneously the start of the first cut sheet, and after the last sheet has been cut, the remaining unsuitable end is prepared to be cut to waste material.

Various modifications and embodiments will of course be evident to those skilled in this art. Accordingly, the foregoing disclosure is to be taken as illustrative only, and not limiting of the scope of the present invention.

What is claimed:

1. A shearing machine for cutting band material, comprising a main frame, upper and lower cutter elements carried on said main frame, means for feeding said band material to said cutter elements, and means for driving said cutter elements and material feed means, at least one of said cutter elements being rotatably mounted in the side walls of a cutter frame, said cutter frame being mounted pivotably on said main frame, a twin crank synchronizing mechanism being operatively connected between said cutter element drive means and the cutter element mounted in said cutter frame, said twin crank mechanism comprising a driving crank secured to said cutter element drive means, a driven crank adapted to drive said cutter element operatively connected thereto, and a connecting rod linking said driving and driven cranks, said driving crank being rotatable about an axis which is in fixed spatial relationship to said main frame, and said driven crank being rotatable about an axis pivotable with said cutter frame.

2. The shearing machine according to claim 1, wherein said upper cutter element is carried by said cutter frame and said cutter frame is pivotable adjacent the lower end thereof about a crank shaft carrier mounted in said main frame.

3. The shearing machine according to claim 1, wherein said lower cutter element is carried by support means mounted upon the cranks of said crank carrying shaft whereby the position of said lower cutter element relative to said upper cutter element is determined.

4. The shearing machine according to claim 1, wherein means are provided for adjusting the angular position of said cutter frame relative to said main frame and thereby simultaneously adjusting the offset distance between the rotational axes of said driving and driven cranks.

5. The shearing machine according to claim 2, wherein said drive means includes gear transmission means connectable through said twin crank mechanism to said upper cutter element and connectable to said material feed means and crank shaft carrier, whereby said shaft is adapted to be rotated at a rotational speed which is a proper fraction of the rotational speed of said driving crank.

6. The shearing machine according to claim 1, wherein said cutter elements comprise cutter knives secured to respective cutter drums.

7. The shearing machine according to claim 1, wherein said cutter elements comprise cutter knives actuated by a four joint mechanism.

8. The shearing machine according to claim 2, wherein means are provided for disengaging the said drive means to said twin crank mechanism and for actuating said lower cutter element by rotation of said crank carrying shaft.

9. The shearing machine according to claim 2, wherein said crank shaft supported on the main frame as a portion coaxially with the pivoting axis of the cutter frame and portions offset therefrom eccentrically, said eccentrically offset portions causing said lower cutting element to be spaced from the upper cutting element.

10. The shearing machine according to claim 2, including transmission means for a rotating said eccentric shaft at a speed being a proper fraction of the rotating speed of the twin crank mechanism.

11. The shearing machine according to claim 10 comprising means for disengaging the drive of the twin crank mechanism and for actuating the lower cutting knife by means of the eccentric shaft.

* * * * *